(12) United States Patent
Wang et al.

(10) Patent No.: US 8,145,940 B1
(45) Date of Patent: *Mar. 27, 2012

(54) METHOD AND SYSTEM FOR UPDATING A SOFTWARE IMAGE

(75) Inventors: Frank G. Wang, Boca Raton, FL (US); Scott D. Aiken, Boca Raton, FL (US); Juliano Maldaner, Delray Beach, FL (US); Dennis E. Kelly, Boca Raton, FL (US); Michael S. Goldflam, Wake Forest, NC (US)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,966

(22) Filed: Feb. 15, 2010

Related U.S. Application Data

(63) Continuation of application No. 11/213,502, filed on Aug. 26, 2005, now Pat. No. 7,664,984, and a continuation-in-part of application No. 10/267,492, filed on Oct. 9, 2002, now Pat. No. 7,024,581.

(51) Int. Cl.
*G06F 11/00* (2006.01)
(52) U.S. Cl. ........................................ 714/6.1
(58) Field of Classification Search ............... 714/2–13, 714/18–20, 37–39, 42
See application file for complete search history.

(56) References Cited

U.S. PATENT DOCUMENTS

| | | | |
|---|---|---|---|
| 5,212,784 A | 5/1993 | Sparks | |
| 5,469,573 A | 11/1995 | McGills et al. | |
| 5,537,540 A | 7/1996 | Miller et al. | |
| 5,644,698 A | 7/1997 | Cannon | |
| 5,745,672 A | 4/1998 | Stiffler | |
| 5,764,593 A | 6/1998 | Turpin et al. | |
| 5,790,773 A | 8/1998 | Dekoning et al. | |
| 5,829,045 A | 10/1998 | Motoyama | |
| 5,852,713 A | 12/1998 | Shannon | |
| 5,857,208 A | 1/1999 | Ofek | |
| 6,047,294 A | 4/2000 | Deshayes et al. | |
| 6,073,220 A | 6/2000 | Gunderson | |
| 6,081,879 A | 6/2000 | Arnott | |
| 6,138,179 A | 10/2000 | Chrabasz et al. | |
| 6,167,532 A | 12/2000 | Wisecup | |
| 6,173,291 B1 | 1/2001 | Jenevein | |

(Continued)

FOREIGN PATENT DOCUMENTS

EP     0 858 031     8/2002

(Continued)

OTHER PUBLICATIONS

Backup Exec for Windows NT and Windows 2000; Sep. 2000 (392 pages).

(Continued)

*Primary Examiner* — Nadeem Iqbal

(57) ABSTRACT

A method and system for updating or recovering a computer device's software image using a single portable operating system image stored on a bootable, secure partition on local storage (hard drive); a method and system utilizing delta image patching technology to allow the single image to work on a large number of diverse computer device platforms; and a method for distributing software patches and updates via a, secure local partition to ensure patches and updates are applied to well known software images that have not been modified to include malicious software and do not include any other undesirable changes that have been made to the primary, running operating system image.

10 Claims, 12 Drawing Sheets

U.S. PATENT DOCUMENTS

| | | | |
|---|---|---|---|
| 6,175,904 B1 | 1/2001 | Gunderson | |
| 6,178,503 B1 | 1/2001 | Madden et al. | |
| 6,192,488 B1 | 2/2001 | Li | |
| 6,205,527 B1 | 3/2001 | Goshey et al. | |
| 6,205,558 B1 | 3/2001 | Sobel | |
| 6,216,211 B1 | 4/2001 | McBrearty et al. | |
| 6,289,426 B1 | 9/2001 | Maffezzoni et al. | |
| 6,374,363 B1 | 4/2002 | Wu et al. | |
| 6,385,707 B1 | 5/2002 | Maffezzoni | |
| 6,385,721 B1 | 5/2002 | Puckette | |
| 6,393,560 B1 | 5/2002 | Merrill et al. | |
| 6,442,067 B1 | 8/2002 | Chawla | |
| 6,477,629 B1 | 11/2002 | Goshey et al. | |
| 6,490,722 B1 | 12/2002 | Barton et al. | |
| 6,532,535 B1 | 3/2003 | Maffezzoni et al. | |
| 6,557,169 B1 | 4/2003 | Erpeldingerl | |
| 6,560,703 B1 | 5/2003 | Goodman | |
| 6,684,229 B1 | 1/2004 | Luong | |
| 6,748,553 B2 | 6/2004 | McBride et al. | |
| 6,754,855 B1 | 6/2004 | Denninghoff et al. | |
| 6,807,630 B2 | 10/2004 | Lay | |
| 6,845,464 B2 * | 1/2005 | Gold | 714/6 |
| 6,851,073 B1 | 2/2005 | Cabrera et al. | |
| 6,859,925 B2 | 2/2005 | Lin | |
| 6,862,681 B2 | 3/2005 | Cheston et al. | |
| 6,901,493 B1 | 5/2005 | Maffezzoni | |
| 6,928,579 B2 | 8/2005 | Aija et al. | |
| 6,931,522 B1 | 8/2005 | Raghavan et al. | |
| 6,934,722 B1 | 8/2005 | Goshey et al. | |
| 6,934,881 B2 | 8/2005 | Gold et al. | |
| 6,948,099 B1 | 9/2005 | Tallaml | |
| 6,963,951 B2 | 11/2005 | Ng et al. | |
| 6,993,642 B2 * | 1/2006 | Burkhardt et al. | 713/1 |
| 6,996,828 B1 | 2/2006 | Kimura et al. | |
| 7,000,231 B1 | 2/2006 | Gold | |
| 7,024,581 B1 * | 4/2006 | Wang et al. | 714/2 |
| 7,124,322 B1 | 10/2006 | Backman | |
| 7,216,251 B2 | 5/2007 | Gaunt et al. | |
| 7,430,686 B1 * | 9/2008 | Wang et al. | 714/6 |
| 7,516,319 B2 * | 4/2009 | Chen | 713/2 |
| 7,689,861 B1 * | 3/2010 | Wang et al. | 714/6 |
| 2002/0059498 A1 | 5/2002 | Ng et al. | |
| 2002/0083362 A1 | 6/2002 | Semo et al. | |
| 2003/0012114 A1 | 1/2003 | Larvoire et al. | |
| 2003/0023839 A1 * | 1/2003 | Burkhardt et al. | 713/1 |
| 2003/0101189 A1 * | 5/2003 | Lanzatella et al. | 707/100 |
| 2003/0200480 A1 | 10/2003 | Beattie | |
| 2006/0053270 A1 * | 3/2006 | Dunn et al. | 712/13 |
| 2006/0271819 A1 | 11/2006 | Cluff et al. | |
| 2007/0046791 A1 * | 3/2007 | Wang et al. | 348/231.6 |

FOREIGN PATENT DOCUMENTS

| | | |
|---|---|---|
| WO | WO 95/12848 | 5/1995 |
| WO | WO 00/16193 | 9/1998 |
| WO | WO 00/14638 | 3/2000 |
| WO | WO 01/59564 | 8/2001 |

OTHER PUBLICATIONS

Backup Exec for Windows NT and Windows 2000; Oct. 2001 (979 pages).
Veritas Backup Exec Network Storage Executive; Sep. 2000 (465 pages).
Design and Implementation of a Distributed File System; Goldstein (11 pages).
Powerquest V2i Protector New Release; August 202 (2 pages).
Adaptec ReZoom Product FAQs (5 pages).
Symantec Ghost Implementation Guide (326 pages).
Norton Ghost 2001 User's Guide 2001 (108 pages).
ReZoom ZDnet Review; Dec. 1999 (2 pages).
Powerquest Drive Image 1.0 (27 pages).
VAX/VMX Distributed Lock Manager; Snaman (16 pages).
Powerquest Drive Image User Guide (156 pages).
Powerquest V2i Protector 1.0 User Guide (79 pages).
Adaptec ReZoom Product Review (3 Pages).
Adaptec ReZoom Product Tour Setup (3 Pages).
Adaptec ReZoom Product Tour Recovery (3 Pages).
Adaptec ReZoom Product Tour Using ReZoom (4 Pages).
Adaptec ReZoom Product Tour Setup Cont. (3 Pages).
Adaptec ReZoom Product Tour Testing Recovery (2 Pages).
Adaptec ReZoom Software (2 Pages).
Adaptec ReZoom Product FAQs (6 Pages).
Adaptec ReZoom Software Features (4 pages).
Powerquest ServerMagic 2.02 White Paper (12 pages).
Adaptec ReZoom Technoogy Comparison (6 Pages).
Powerquest Drive Image 5.0 Protect Data Automatically (2 pages).
Powerquest Drive Image 2002 (4 pages).
Powerquest Drive Image Pro Deploying Windows Workstations (2 pages).
Powerquest Deploy Center 5.01 Press Release (2 pages).
Drive Image Pro 4.0 Uses Guide (238 pages).
Drive Image Pro 3. White Paper (20 pages).
Drive Image SE White Paper (13 pages).
Windows ME; (344 pages).
Drive Image 2002 Backup (4 pages).
Window XP Change Drive Letter Assignments (4 pages).
Windows XP Multiboot System (8 pages).
How to Install or Upgrade Windows XP (7 pages).
How to Partition and Format a Hard Disk Using Windows XP Setup Program (6 pages).
How to Setup and Use Automated System Recovery in Windows XP (3 pages).
How to Start the System Restore Tool in Windows XP (3 pages).
How to Use Disk Management in Windows XP (4 pages).
How to Use Backup Utility in Windows XP Home (3 pages).
Windows ME; (3 pages).
Windows ME Quick Start Guide (74 pages).
Windows XP System Restore (8 pages).
Windows ME Release to Manufacturing (2 Pages).
Powerquest Drive Image 2002 Simplifies PC Disaster Recovery (2 Pages).
Powerquest Drive Image 2002 Review (9 pages).
Powerquest Drive Image 2002 Article (6 pages).
Solving Problems in Windows ME (Part I) (8 pages).
Solving Problems in Windows ME (Part II) (14 pages).
Windows ME Step by Step (282 pages).
Reference Model for Open Storage System Interconnection (38 pages).
Windows Using Backup to Protect Data (2 pages).
What's New in Drive Image Pro 4.0 (1 page).
Microsoft News Center Windows ME; Sep. 2000 (3 pages).
Windows ME the Missing Manual (418 pages).
Windows XP Backup Made Easy (4 pages).
Computer Gaming World Backup Data Before Nuke Any Drive Partition (3 pages).
Windows 2000 Power Toolkit (21 pages).
Disk Imaging Article Nov. 2002 (2 pages).
Windows XP Set, Change, Remove Special Permissions for Files and Folders (6 pages).
Paragon Drive Backup (59 pages).
Windows XP Types of Backup (2 pages).
Windows Virtual PC Article (14 pages).
Unix Backup and Recovery; Curtis Preston (36 pages).
Windows NT Backup & Recovery (40 pages).
MS-DOS Bible; Steven Simrin (3 pages).
DOS Primer for IBM PC & XT; Mitchell Waite et al. (60 pages).
Hard Drive on a Keychain Article (2 pages).
Microsoft 95 MS-DOS Prompt (14 pages).
Creating a Windows 95 Startup or "Rescue" Disk; George Skarbek (2 pages).

* cited by examiner

HARD DISK SECTORS BEFORE ANY CHANGES ARE MADE

HARD DISK SECTORS AFTER CHANGES ARE MADE

METHOD AND SYSTEM FOR UPDATING A SOFTWARE IMAGE

CROSS REFERENCE TO RELATED PATENTS

This patent application is a continuation patent application of Ser. No. 11/213,502 filed Aug. 26, 2005, issued as U.S. Pat. No. 7,664,984 on Feb. 16, 2010. That patent is sometimes referred to herein as the Parent Patent.

The present invention is also a continuation-in-part of a previously-filed patent application entitled "Data Processing Recovery System and Method Spanning Multiple Operating Systems" filed Oct. 9, 2002 as Ser. No. 10/267,492 by inventors Frank C. Wang et al. and issued as U.S. Pat. No. 7,024,581 on Apr. 4, 2006. The specification of this related patent, which is sometimes referred to herein as the Rapid Restore Patent, is expressly incorporated herein by reference. Patent application Ser. No. 12/749,577 was filed Mar. 10, 2010 as a continuing patent application based on Ser. No. 12/286,202 which was filed Sep. 29, 2008 (and issued as U.S. Pat. No. 7,689,861 on Mar. 30, 2010) as a divisional of patent application Ser. No. 11/396,894, now U.S. Pat. No. 7,430,686, which was filed as a division of the Rapid Restore Patent.

The present invention is also related to a patent application Ser. No. 11/213,503, filed Aug. 26, 2005, concurrently with the Parent Patent, entitled Method and System for Deploying a Single Image to Personal Computer(s) by the same inventors. The specification of this related patent, which is sometimes referred to herein as the Image Deploy Patent, is expressly incorporated herein by reference. Applicants request the benefit of each of the patents and patent applications listed in this section.

FIELD OF THE INVENTION

This invention relates generally to a personal computer (sometimes referred to as a PC), traditional server or blade server, that runs its operating system and software applications from its local storage (hard disk), or SAN or NAS attached storage where the software image has been deployed initially but needs to be periodically updated. For simplicity, we will generically refer to both traditional and blade servers in addition to workstations as PC's or personal computers. More particularly, the present invention relates to a method and system for reducing the complexity and cost of updating the deployed software image by using an "image delta" technology combined with a known-state image to reduce the number of images required for a plurality of PCs and to simplify the process of updating (refreshing or restoring) the software image in the computer.

BACKGROUND OF THE INVENTION

Most computer devices, such as personal computers, have a software image in a local storage medium, such as a hard disk, that includes the base operating system and applications required to run the computer. Various techniques are known in prior art to get the initial software image loaded onto each computer device, and one novel technique has been disclosed in the Method and System for Deploying a Single Image to Personal Computer(s) patent (the Image Deploy Patent referenced above).

That installed software image is requiring more frequent updating than it did in the past. New versions of software, including the operating system and applications, are one reason why the software image on a personal computer needs to be updated. Another reason is that more defects are being identified after the software has been installed, sometimes as a result of attacks or as a result of errors reported by users. Further, the software frequently is enhanced with new and improved features and functions. All of these changes mean that the software image stored on a computer must be updated to achieve the best results.

The updating of software has also been required more often with the increasing frequency of viruses and other harmful code (such as trap doors and Trojan horses), which are distributed through the Internet and other networks. As users more frequently connect to such sources of un-trusted code and potentially harmful materials, the proliferation of viruses and the detection and neutralization of such viruses is becoming a significant challenge. Recently, it seems that a new piece of code (such as a new release of Windows) is hardly announced before new attacks are launched on it, particularly for a piece of code such as a widely-used operating system. The discovery of new attacks leads to patches for the code, patches which must be distributed and installed on each personal computer in order to be effective.

Due to the complexity of the software running on computer devices, the number of security issues being found and the rate of updates for software applications, the number of changes required to the software image is increasing at a very fast rate. These changes to the software image include but are not limited to operating system patches that fix software defects, operating system patches that fix security issues, application patches that fix software defects, application updates that enhance application functionality and the delivery of new applications. These updates to the software image need to be applied to devices that have already been deployed in the field.

Today's solution to updating computer devices already deployed in the field is to download these patches and software updates to the currently running device and apply them to the running copy of the software image. As a result, if the running copy of software contains any "malware" (such as spyware or viruses), then this "dirty" machine is still "dirty" after the patch or upgrade is applied. In addition, organizations are trying to apply these changes to deployed devices as quickly as possible since many of the changes are security updates needed to keep devices from being compromised by malicious software. Failures during the update procedure are common since the updates are frequent and the testing is limited due to the difficulty in testing all combinations of software images with the deployed hardware in a reasonable amount of time. Some failures also occur because the running software image is constantly changing as the software is run by each user. There are many ways in which the software image changes as it is used. Some of the changes a user makes intentionally to the software image include downloading and installing a new application, updating an existing application and installing a plug-in for an existing application. Many changes to the software image are made automatically by software, without a human controlling it (or sometimes even being aware of it). These changes include automatic updates of the operating system and applications over the Internet, changes to the core operating system when a new hardware peripheral is attached and changes from malicious software such as worms and viruses. In addition, normal day-to-day usage of a computer with a local storage medium will cause local files and setting to be modified. This makes each software image on deployed devices unique and therefore the chance of the required patches and software updates failing is significant.

A better method to update software images for deployed devices is critical. The cost of software update failures is enormous in terms of lost productivity and information technology (IT) costs associated with rebuilding a device that fails to update correctly. The ability to apply software updates to a well-known "clean" image without losing user data is required to improve the software update method. This will clean a "dirty" machine infected with virus and spyware, while increasing the success rate compared to prior art software distributions.

Other disadvantages and limitations of the prior art systems are also apparent to those skilled in the relevant art and will be apparent from the description of the present invention.

SUMMARY OF THE INVENTION

The disclosed invention overcomes the above limitations and disadvantages involved with updating software images. This invention uses image and file delta technology and introduces a new methodology of utilizing images of a known state. The disclosed system employs a secure partition on the local storage medium to store an alternate operating system, software images, software updates and user data. This secure partition is used in conjunction with image and file delta technology to minimize the number of software images required in an organization as well as to provide performance enhancements. This secure partition with the delta technology is also used to apply software updates to a stored image and provides a method to do so without losing locally stored user data.

As described previously, one of the major problems with updating an image on deployed devices is that the image on each device is constantly changing which makes it difficult to know if required software updates will work on each device. In addition, in prior art any of the problems related to virus or spyware on a running OS are retained on the new running OS. The present invention uses at least one of a variety of methods to solve these common problems.

One advantage of the present invention is that the present invention allows for updating computers to a known state image. These computers are considered running in an unknown state and assumed to have user data stored on the local storage medium which needs to be maintained. One of the disclosed methods adds new or updated software to devices already deployed by pushing software updates through the primary operating system using well-known software techniques. To overcome previously described limitations with this method, the present invention does not apply the updates via the "dirty" primary operating system but uses a process to ensure devices are at a well-known state before the updates are made. The present system keeps track of each sector-by-sector change that occurs on the device's local storage medium. This is utilized to enhance the performance of the current invention, however could also be performed through changing all the sectors on the drive based upon the well-known image. When a device needs to be upgraded with a new set of software, the present system uses the following steps. First, the present system takes a delta snapshot of the device to capture all new data that is on the device referred to as "user data" as well as any computer and user specific information referred to as "local settings" and puts this information into a known location, such as a secure partition. The present system may perform this first step from the alternate operating system (preferably in the secure partition), therefore not requiring the primary operating system to be operational when this process occurs. Second, the device is rolled back to the original image by restoring only those deltas to the device that have been modified since the original image. The present system keeps track of which sectors of the local storage medium have been modified since the original image was restored and only recovers this delta set of sectors. This method greatly reduces the time needed to recover back to an earlier image. However, the current invention is still relevant if the whole image of the well-known image is restored. Third, the device is brought back to the last software update level by recovering a locked down incremental restore point that represents the last approved update level. Fourth, the new software updates are applied to this clean state. Please note that these software updates may either be applied through prior art software distribution techniques or through an additional delta pack of the current invention being layered on top of the last known-state image. Fifth, the "local settings" captured in the first step are reapplied. Sixth, another locked down incremental snapshot is taken to capture the new approved update level to allow the entire process to occur again later when there is another set of software updates available. Lastly, the "user data" captured in the first step is re-applied to the device.

It is possible to change some of the order above and achieve similar results. For example, it is possible to not apply the local settings back to the running image prior to taking the new snapshot for your new locked down point, and restoring this information at the same time the user data is restored.

A variation on the updating method used by the present system works when the original image or locked down point image are replaced with a new delta pack and already contain the update which is provided in step number 4 in the paragraph above. In this case, the distribution of the new functionality is no longer required to be distributed, and there is no longer a requirement to take a new snapshot for the locked down point as this would already be well-known as it was deliberately distributed.

A variation on the updating method used by the present system, works on devices that do not store user data locally, but instead store any user data on a network resource. Even when user data is not stored locally, the local image is constantly changing for reasons, which have been previously described. The present system stores a copy of the original software image, preferably in a secure partition on the local storage medium. The device never runs from this original image, assuring that recent security patches are applied before it becomes operational. All patches and software updates are applied to this original software image, preferably after it has been recovered into the primary partition.

The patches and software updates, known collectively as the delta package, are stored separately from the original software image (which is preferably in the secure location on the local storage medium) to allow the device to be recovered either to the original image or to one of a set of image levels. Each image level represents a different set of delta packages, with the first image level being the original deployed software image before any delta package was applied or a new image that has been designated as the new base image. This may be utilized in a situation where the core image has been in the field for a period of time and requires a large amount of changes, which an organization may want in their core image. An example would be to roll up all security patches released over the last year and create a new core image. This image could be remotely distributed and become the new baseline for the current invention. With the present system, the device can be rolled back to any of these image levels at any time, even if the running image no longer boots properly into the primary operating system.

The present system puts the delta package into storage (preferably the secure location) either while the primary operating system is running or when an alternate operating system is running. By putting the delta package in the secure location while the primary operating system is running, the device can perform its normal operations while updates are staged in the secure location. The secure location stores an alternate operating system that is booted to perform operations such as recovering the primary operating system. In addition, this alternate operating system can collect the delta package. This allows the device to receive the delta package even if the primary operating system environment is not able to run properly to receive the delta package. One example where the alternate operating system needs to be used to receive the delta package is when the primary operating system has a security issue that requires the delta package to resolve. If the security issue is significant enough to prevent the transfer of the delta package in the primary operating system environment, the present invention can still get the delta package to the local secure location by running from the alternate operating system environment. Once the delta package is in the secure location, the device can be recovered to the latest image level that includes this delta package with the security patch.

By using a secure location in the local storage medium for all images, the present system is able to stage the patches and software for the update process. In a company distributed across multiple sites, it is difficult to get the updates to all devices at once. This process can consume significant network resources and requires all devices have access to where the updates are stored at the same time. By using a secure location in the local storage medium to hold the delta packages, the packages can be distributed to all devices over a period of time without concern that the packages will be deleted or modified by the user or malicious software running on a device. The process of applying these packages is therefore separated from the distribution of the packages, assuring that actual deployment is much more simultaneous across all devices.

When a device requires an update to its software image, the device receives only the delta packages that the device does not already have. This process may be driven by the client device or the server. The client device communicates with the server (regardless of which device initiated the communication) to determine what image level is available. Either the client compares image levels available with its current level and requests all delta packages equivalent to the image level of the server, or the server queries the device to perform the same result. For example, if the server has delta packages 1 through 3 as part of this image, and the client only has delta package 1, the client will download delta packages 2 and 3 or the a cumulative package of the changes contained within 2 and 3 to update the local secure area.

Once the delta package transfer process is complete, the local device can immediately initiate the process outlined above to update the primary operating system image, or it can wait for a command from the server to begin the update process. The latter can be used by an enterprise to assure that updates occur only at or after a prescribed time or event.

Other limitations of the prior art, as well as corresponding objects and advantages of the present invention, will be apparent to those skilled in the relevant art in view of the following description of the drawings and the detailed description of the preferred embodiment.

BRIEF DESCRIPTION OF THE DRAWINGS

Other objects and advantages of the present invention will be apparent to those of ordinary skill in the art from the detailed description that follows along with the accompanying drawings, wherein.

DETAILED DESCRIPTION OF A PREFERRED EMBODIMENT

Figure 1:
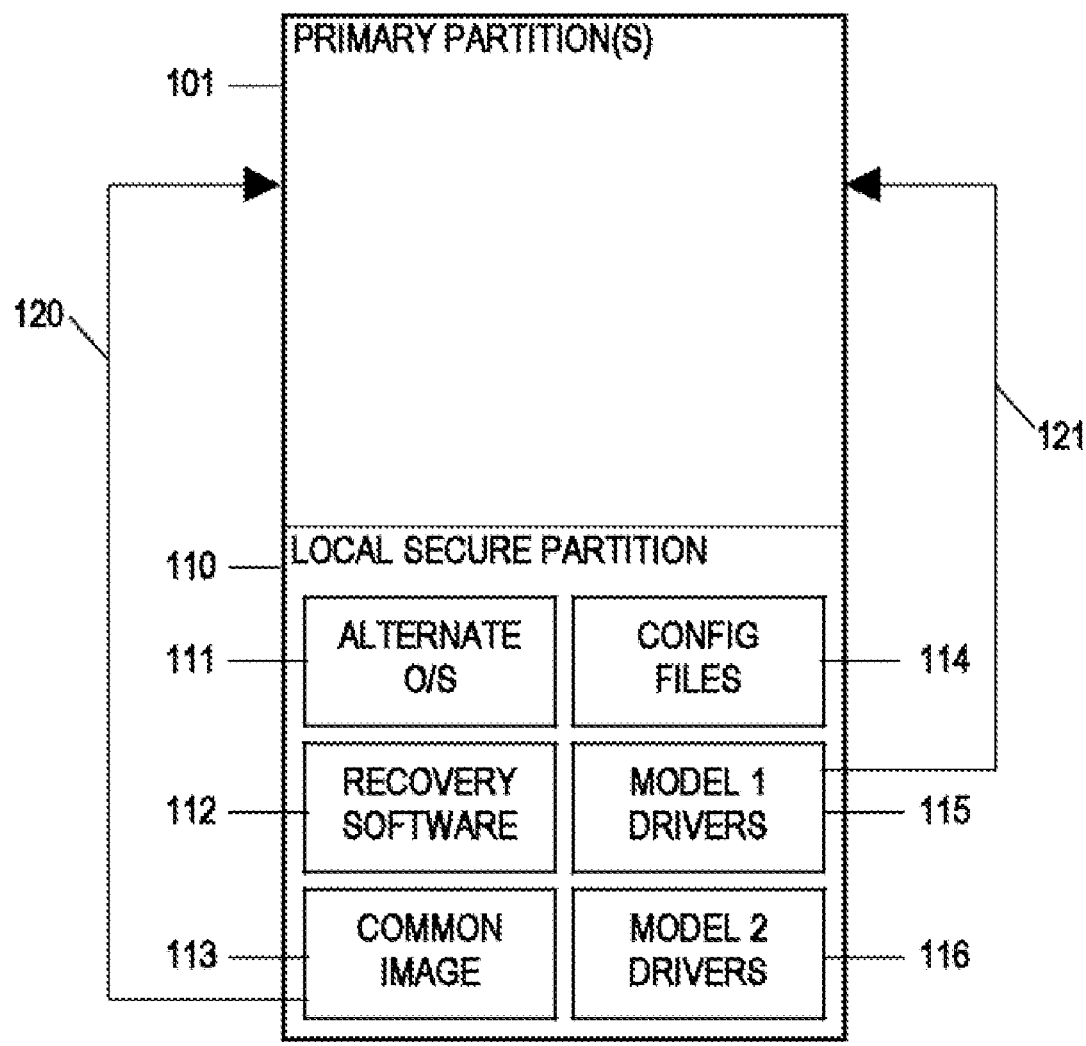
FIG. 1 illustrates a personal computer which uses a method and system of using a primary partition and a second partition on a hard disk to install from a common image and drivers that are contained within the second partition (a secure local secure partition)
Figure 2:
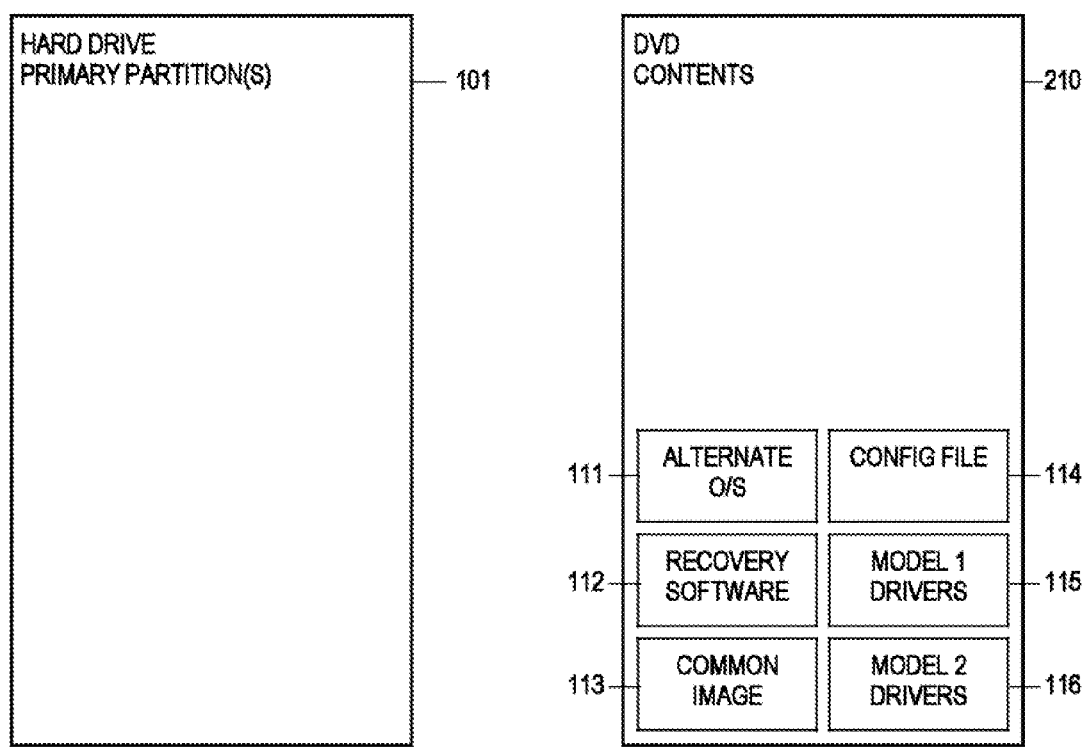
FIG. 2 illustrates the personal computer using a method and system of using a DVD that contains a single portable image to provide the necessary files for the primary partition in the personal computer.

The current system is to provide a method, system and software to update the operating system and applications on devices already in the field. In a preferred embodiment, the present system updates the device software (without losing any user data that is stored on the local device) while "cleaning" the device from viruses and spyware thereby improving success rate compared to prior art. To do so, the device must first be rolled back to a clean (functional) restore point. Otherwise, unwanted changes to the operating system image will be included in the update process and will accumulate with each successive update. For performance gains, the present system may keep track of all sector-based changes to the device to enable a quick roll back to the original image at the appropriate time. However, the current invention is still relevant even if the entire image is restored to obtain a known-state image.

FIG. 3 shows how the software of the present system keeps track of changes made to the primary partition. e.g., sector changes. A representation of hand disk sectors 301 in FIG. 3a shows the state of hard disk sector changes right after the original image is put on the device. No sectors have been changed yet. A sector change map 302 in FIG. 3a reflects no changes since the bit map has all sectors set to a value of 0 indicating no sectors on the primary partition have been modified since the original install of the image. Hard disk sectors 310 in FIG. 3b shows the state of the hard disk sectors after the device has been used. In this example, sectors 0 and 4 have been modified, as represented by 0' and 4' in representations 313 and 314, respectively. The present invention updates a sector change map 311 setting the bit representing sectors 0 and 4 to a value of 1, indicating each of these sectors has been modified in FIG. 3b and no longer matches the image that exists in the local secure partition.

Figure 4:
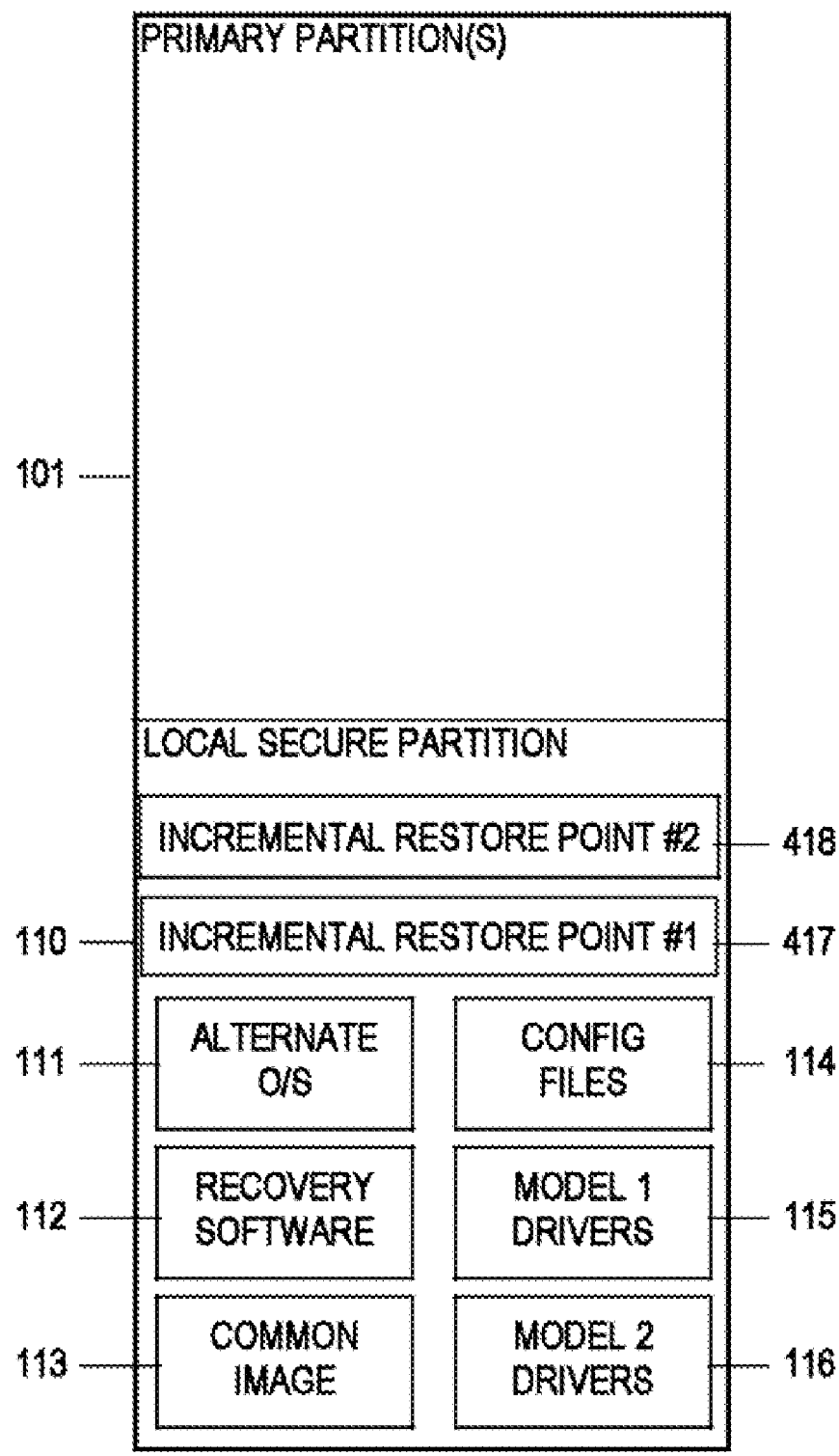
FIG. 4 shows the state of the local secure partition before a delta snapshot.

Before initiating a roll-back operation, the present system takes a delta snapshot of the device to capture all new data that is on the device. This snapshot captures everything that has changed since the last snapshot was taken. When the snapshot is complete, a new restore point is captured and stored so that the device can be recovered to that restore point. To take the snapshot, the device runs as shown in FIG. 4 from alternate operating system 111 that is located in the secure partition 110. FIG. 4 shows what is in the secure partition 110 before the additional snapshot (items 410 through 417) and the details of an additional restore point that is stored in the secure partition after the snapshot is complete, details which are called an incremental restore point. A first incremental restore point 417 is the result of that snapshot at a first time. Later, a second incremental restore point 418 is the snapshot at a later time. After the additional snapshot is complete, files and database records, which include all changes to the primary partition between the last time a snapshot was taken and the time this snapshot is taken, are placed in the secure partition as the second incremental restore point 418. FIG. 4 shows the system for creating a second incremental restore point that captures the deltas from a first incremental restore point 417. In an earlier operation, the present invention could have been used to generate the first incremental restore point 417 which would represent the differences between the first incremental restore point 417 and the original system image.

The present system and method work with any number of incremental restore points, allowing the system to be rolled back to the initial state or to an intermediate point represented by an incremental restore point such as the first incremental restore point 417 and the second incremental restore point 418. These incremental restore points can be established manually (when the user OR administrator decides that he wants to establish one) or on a regular basis, either based on elapsed time (for example, each week or month) or based on the amount of system changes (every time that x changes occur, establish an incremental restore point).

After completion of the delta snapshot, the present system rolls the software in the device back to an earlier version, such as the original system image as represented in FIG. 4 by common image 113 and the appropriate driver set which is represented by Model 1 Drivers 115 or Model 2 Drivers 116. The present system rolls back only those sectors that were modified since the initial image was deployed, (based on the indicators in FIG. 3b).

Figure 3A:
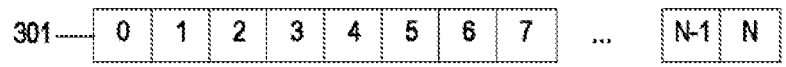
FIG. 3 shows a method for keeping track of sector-based changes in the primary partition(s), using a sector change map showing the sectors which have been changed, with FIG. 3a showing the primary partition and sector change map before changes and FIG. 3b showing the primary partition and sector change map after changes have been made.
Figure 3A:
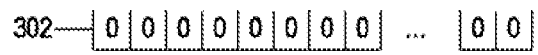
Figure 3B:
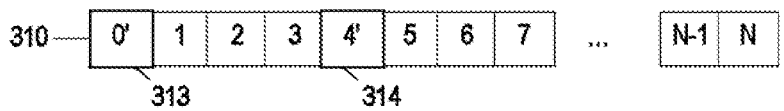
Figure 3B:
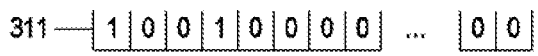
Figure 5:
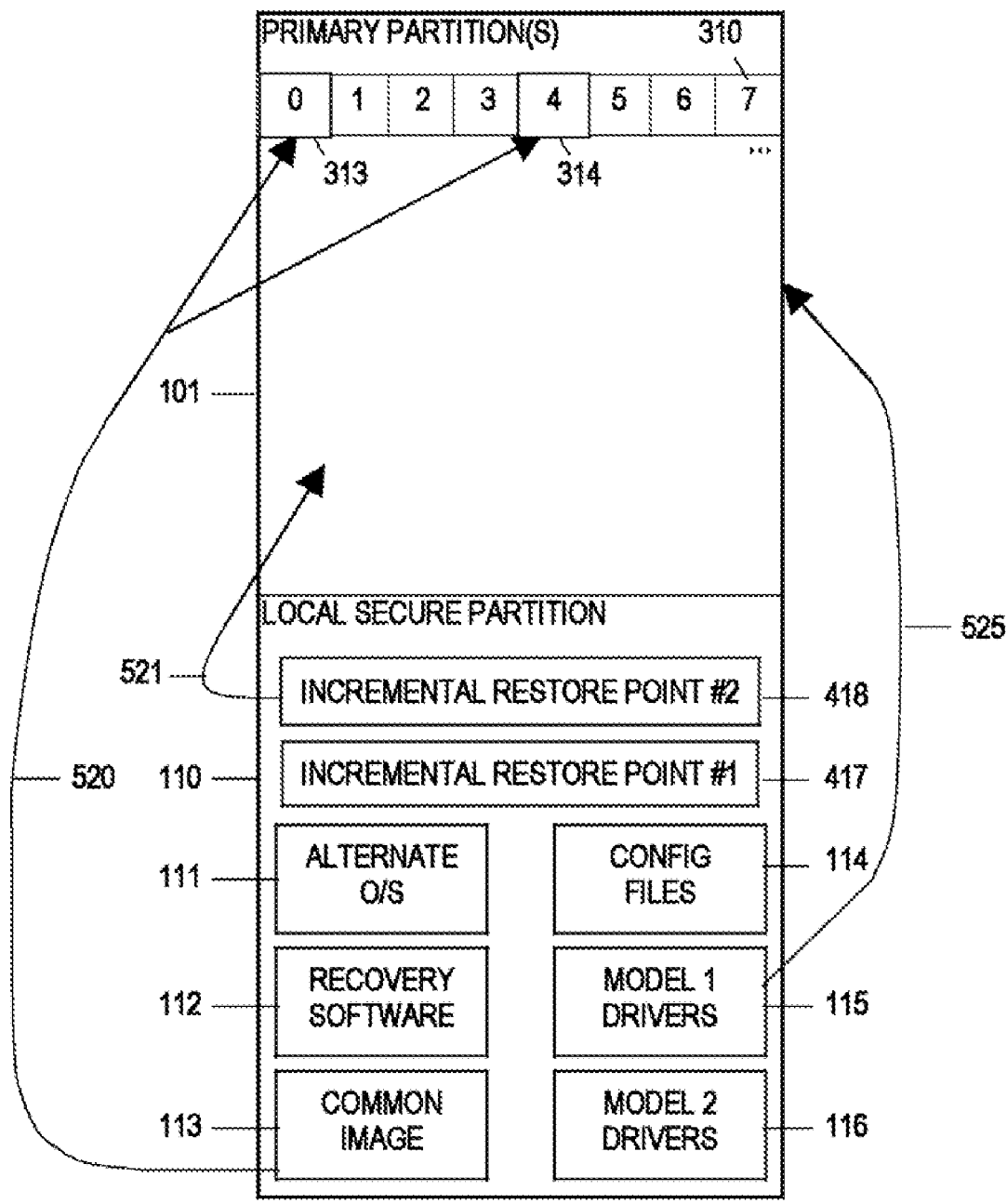
FIG. 5 shows the rollback process to bring a device back to a previous restore point, recovering the primary partition(s) from the local secure partition.

FIG. 5 shows the hard drive sectors 310 with those sectors highlighted 313 and 314 based on the sector change map 311 from FIG. 3b, with sectors 0 and 4 being highlighted as different from the original image and requiring roll back while the other sectors have not been modified (unchanged and therefore not highlighted) and therefore do not require any changes. The sector rollback process is run from recovery software 112 that runs in alternate operating system 112. As shown by an arrow 520, the recovery software 112 takes sectors 0 and 4 from common image 513 and replaces sectors 0 and 4 of the primary partition 101.

The present system then recovers the device to the specified software update level that is represented for illustration by the first incremental restore point 417 in FIG. 5. As shown by an arrow 521, the system overwrites the files in the primary partition 101 with the contents of the second first restore point 417.

The present system then allows either a traditional software distribution update to be applied to the running OS, or applied through the current invention a delta pack that contains the desired changes to the operating system. Because the system was rolled back to a well known image prior to this step, the percentage of success for the application of the distribution increases Additionally, the effects of unwanted changes is greatly reduced if not completely eliminated.

The present system then takes a new restore point based on this well known updated image to be utilized should this process need to be repeated.

The present system then recovers user data from the second incremental restore point 418 in FIG. 5. Only the user data represented by specific directories are recovered from the second incremental restore point 418.

Figure 6:
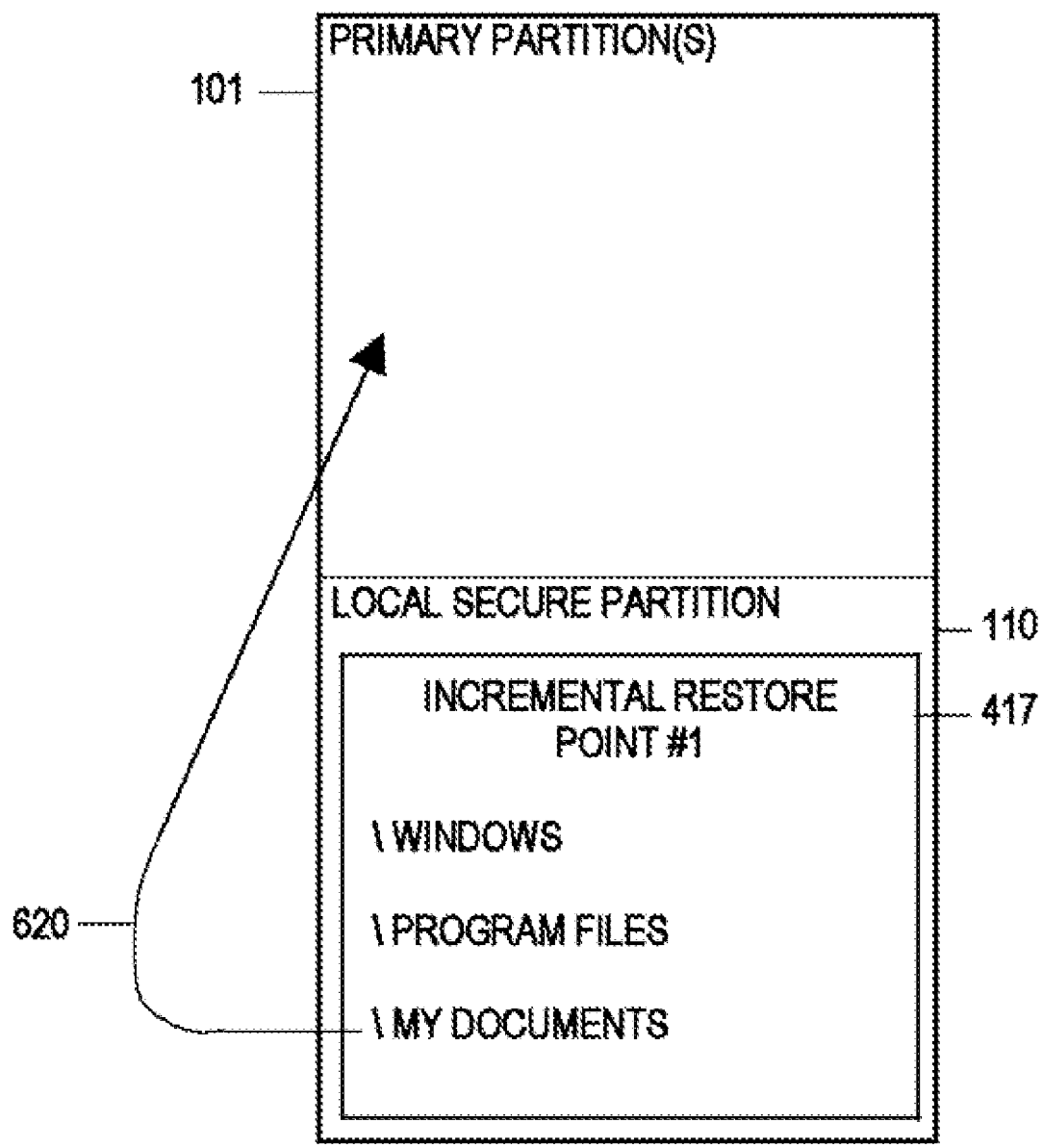
FIG. 6 shows the method used to get the most recent user data back into the primary partition after rolling the device back to a previous restore point by recovering user data from an incremental restore point.
Figure 7:
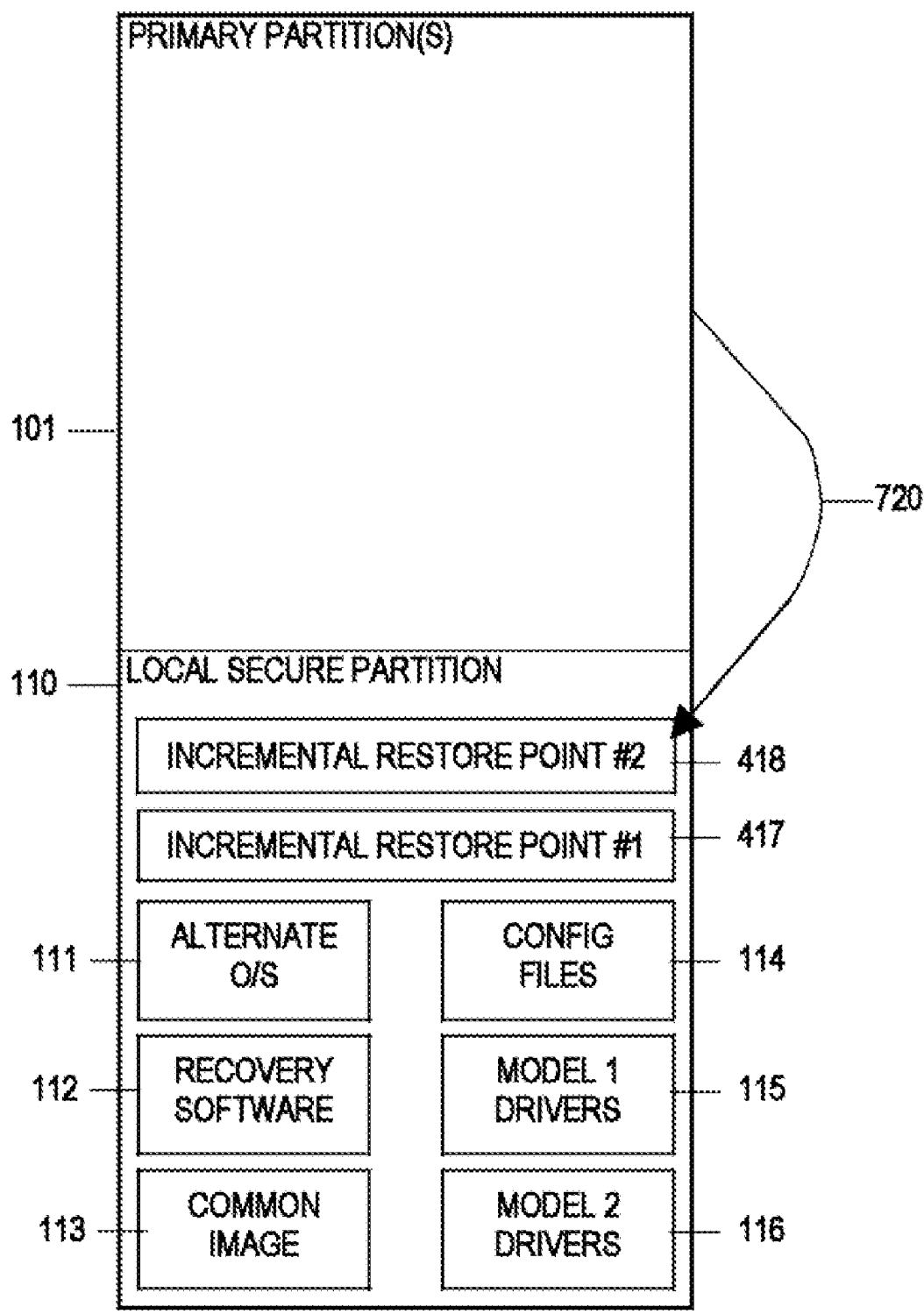
FIG. 7 shows a method used to capture a new restore point after software updates and patches are rolled back or have been successfully applied.
Figure 8:
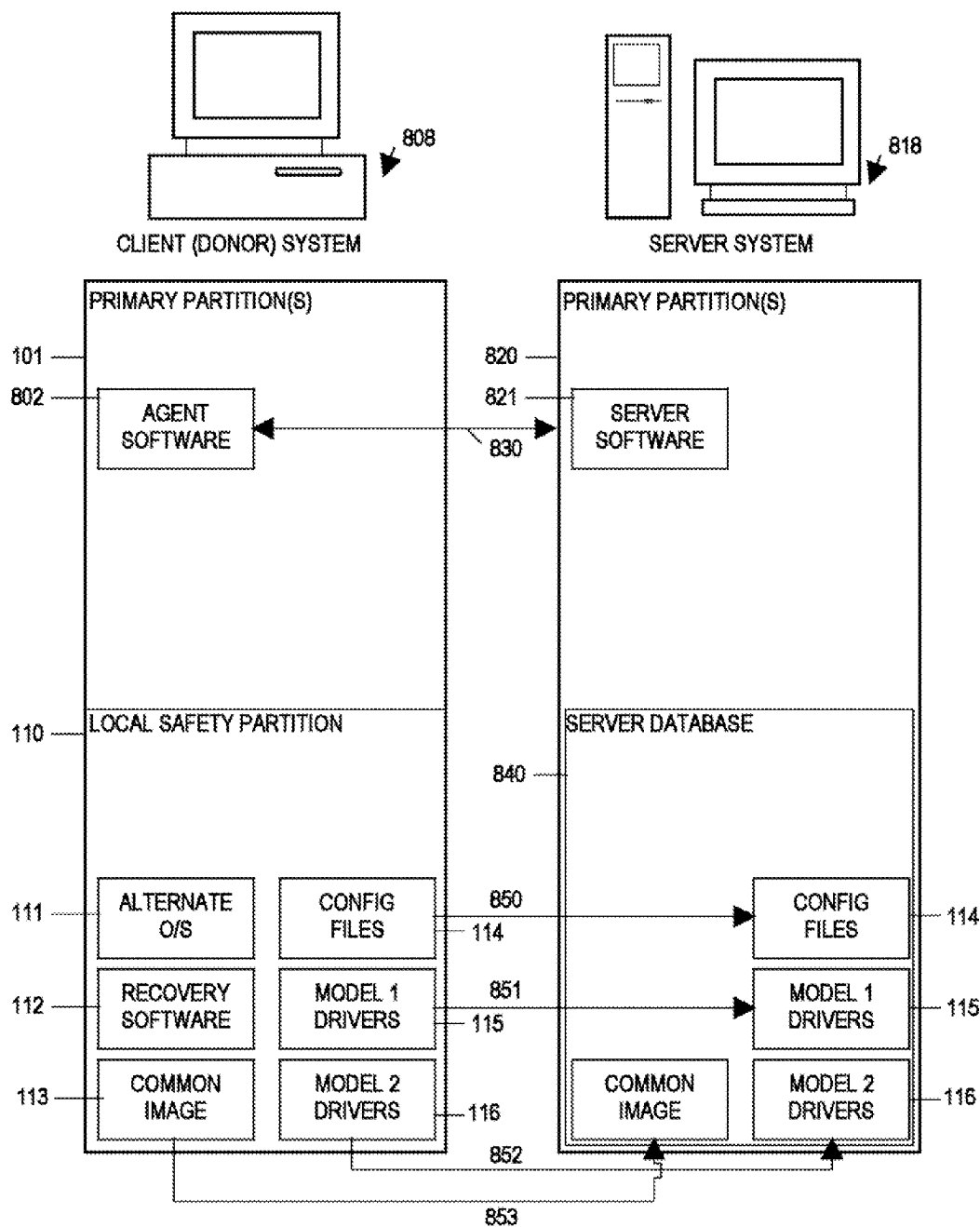
FIG. 8 shows the process of capturing a donor system image that exists in a client local secure partition to a server software database.
Figure 9:
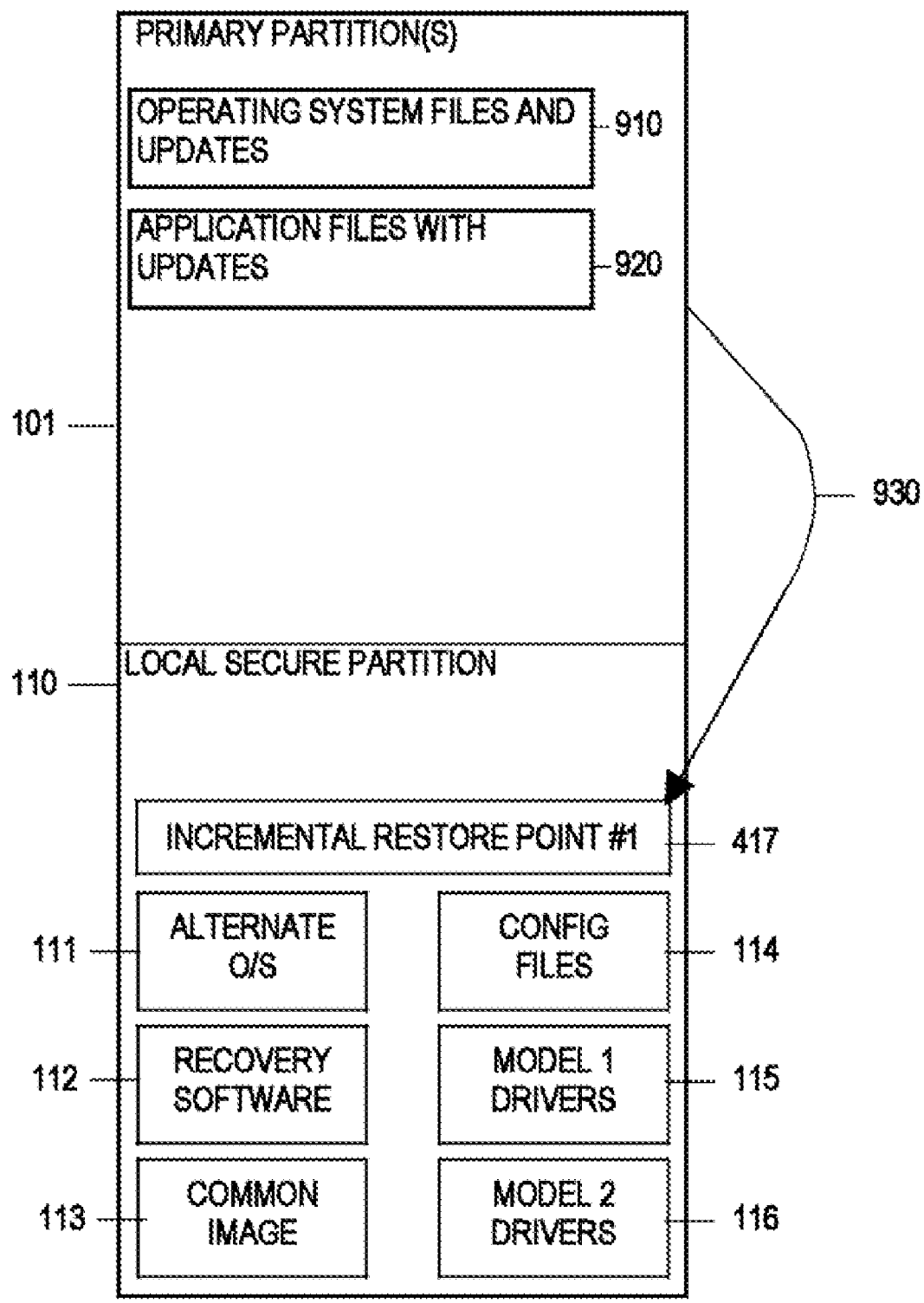
FIG. 9 shows the process of updating a donor system image with software and patch updates and capturing those updates in the local secure partition.
Figure 10:
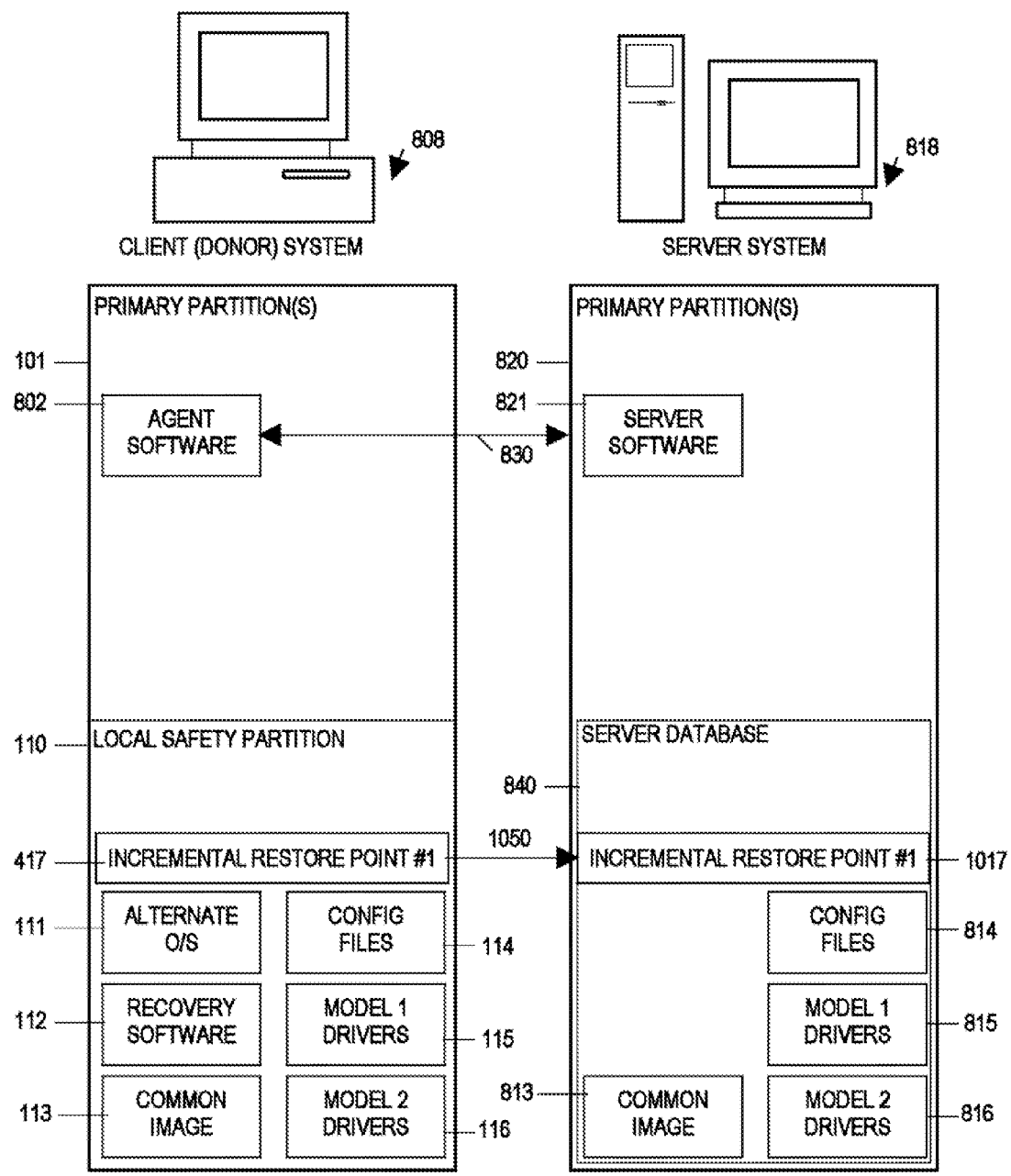
FIG. 10 shows the process of capturing the updates to a donor system image that exists in a client secure partition to a server software database.

FIG. 6 shows in this preferred embodiment the files from a \My Documents section 615 are recovered through an arrow 620 from the secure partition 110 to the primary partition 101, while updates to other folders are not recovered. The present system allows for the flexibility to determine which files and/or folders are recovered, and which ones are excluded. This is required as different organizations may have specific requirements and is controlled via a configuration file.

Please note that the present system is also relevant to devices that are not receiving an update, but go through all the remaining steps of this process to allow the machine to be "cleaned". In effect, the personal files are backed up in the same method disclosed above, the image is restored to the last well known restore point which contains the current desired application set and patches, and then the personal data per the configuration file is restored to the running OS. This has the effect of removing virus and spy-ware, while retaining any of the user's intentional changes.

In a preferred embodiment, the present invention also updates the running software image on devices that do not store user data locally. The invention stores the common portable image within the local secure partition of a donor device in a database on a server device. This original image is a copy of the local secure partition of the donor device that was deployed using the common portable image of the invention.

Figure 11:
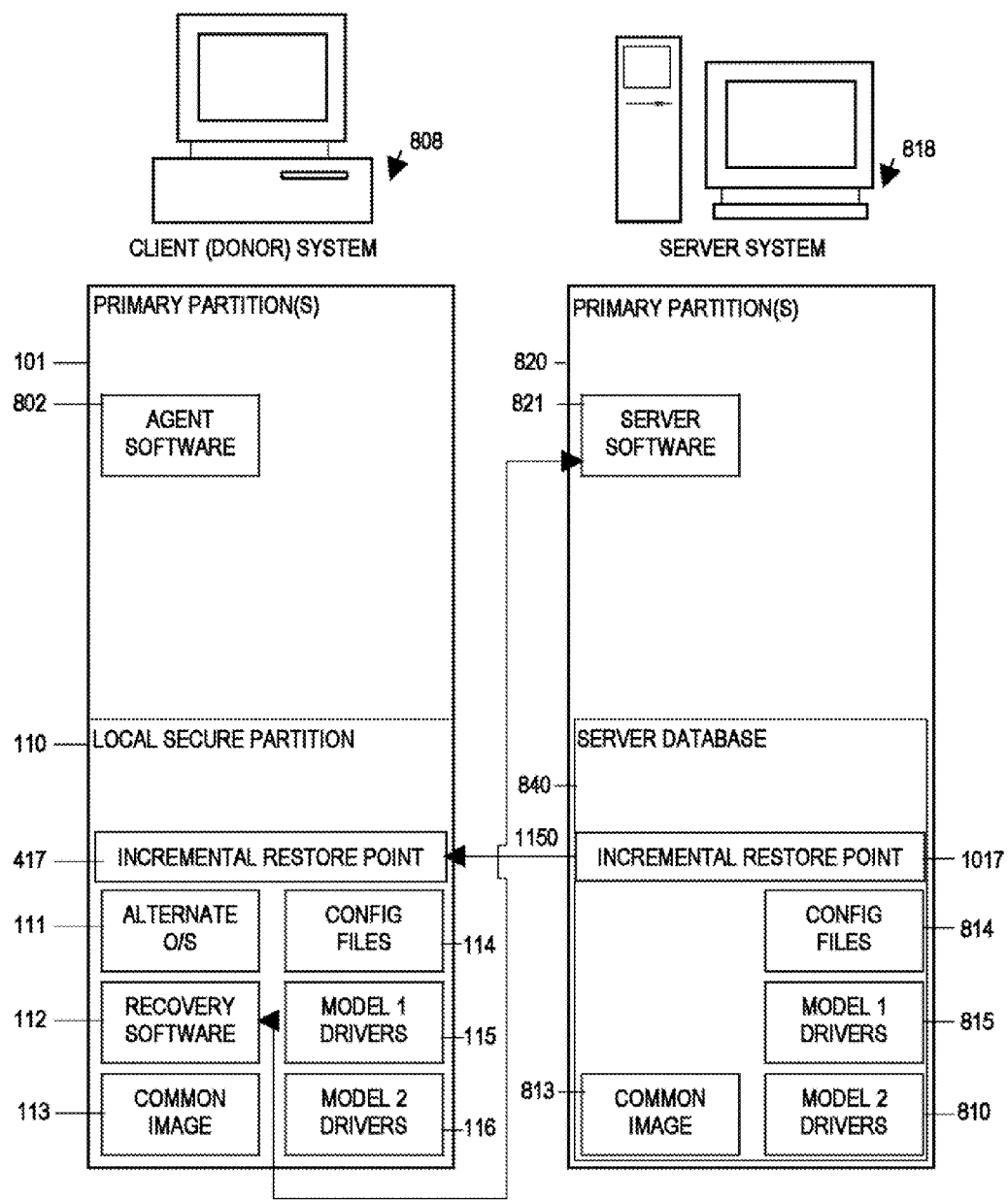
FIG. 11 shows the process of transferring the donor image updates from a server database to client secure partitions on clients running a down level image.

Server software 821 in FIG. 11 transfers a software image update to a down-level client device 808 by updating the client secure partition 110. In the preferred embodiment, the client device 808 nuts its copy of the recovery software 112 from within the alternate operating system 111. The recovery software 122 communicates with the server software 821 (as shown by an arrow 1130) to determine what files need to be transferred from the server database 840 to the secure partition 101 of the client system 808 to bring the local software image up to the latest revision level. A transfer (shown by an arrow 1150) brings all files in the new delta package into the secure partition 110 without transferring files that already exist in the secure partition 110. If files exist in the secure partition 110 that do not exist in the image level represented to the recovery software 112 by the sewer software 821, then those files are removed, since they are no longer required.

In an alternate embodiment, the down-level client device may be updated while running from the primary operating system within primary partition 101, instead of running the alternate operating system 111 from within the secure partition 110. In this alternate embodiment, agent software 802 communicates with the server software to execute a transfer shown by an arrow 802 of the delta package. Though an unlocking mechanism in the current invention, the package is transferred directly to the secure partition. The secure partition is then relocked.

Figure 12:
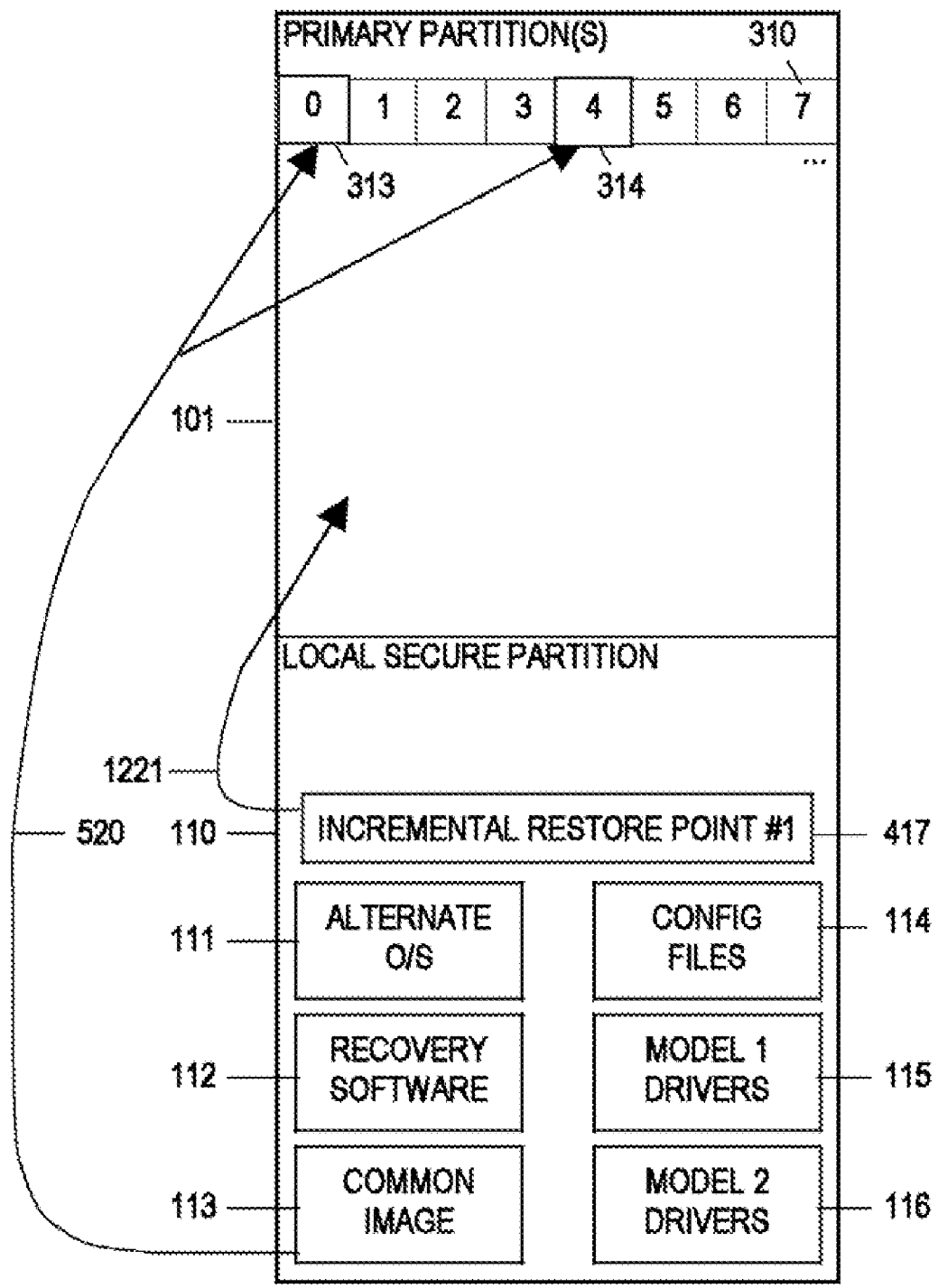
FIG. 12 shows the process of recovering a client to an updated image after the client secure partition has been updated to a new image level.

Upon secure partition update completion (as described in connection with the previous figures), the present invention brings the down-level client device up to the new image level. As shown in FIG. 12, a client device runs from its recovery software 112 from within the alternate operating system 111. The recovery software 112 recovers the primary partition 101 back to the original image by rolling back only those sectors that were modified since the initial image was deployed. FIG. 12 shows the indicators for sectors 0 and 4 (313 and 314) in the sector change map 310 having been bolded to show that these sectors have been changed and therefore need to be rolled back, while all other sectors (represented by the sector change map 310 are left unchanged. As shown by the arrow 520, the recovery software 112 uses the relevant portions of the common image 113 to take sectors 0 and 4 from its common image 113 and replaces sectors 0 and 4 of its primary partition 101.

The present system then recovers the delta pack that was received from the server software and is represented in FIG. 12 by the first incremental restore point 417. As shown by an arrow 1221, the present system overwrites the files in the primary partition with the contents of the first incremental restore point 417.

Of course, many other modifications and alterations are possible to the preferred embodiment described above, and some of the features and functions of the present invention can be used without the corresponding use of other features. Further, while the present invention has been described in conjunction with the installation method described in the Image Deploy Patent, the present system and method for updating an image will be useful without regard to how the initial image was loaded. Further, the method of keeping track of changes and rolling the image back to an earlier version can be used either to roll the image back to an initial install or to some intermediate level, depending on the content of the patches and/or other updates. Other variations, including other ways to identify changes, can be used rather than a sector-by-sector analysis of the changes, for example, by marking the modules which have been changed and identifying which instruction or piece of data has changed and how. The use and type of secure partition have been described in some detail, but are not essential for the present invention. The present invention has been described in the context of a personal computer where the sector is 512 bytes, but the present invention may be practiced on another device which has sectors of a different size. Accordingly, the present description of the preferred embodiment should be viewed as merely illustrative of the principles of the present invention and not in limitation thereof, as the invention is defined solely by the following claims.

Having thus described the invention, what is claimed is:

1. A computer-implemented method of updating software to a data processing apparatus comprising the steps of:
  (a) storing a first operating system in a first storage area of the apparatus and storing user data in the first storage area using the first operating system;
  (b) storing a sector-by-sector image copy of the first storage area in a second storage area using the first operating system, the image copy comprising the first operating system and user data;
  (c) restoring the first storage area using the image copy stored in the second storage area and a second operating system accessible to the apparatus;
  (d) after step (c), applying an update to the apparatus using at least one of the first operating system and the second operating system.

2. The computer-implemented method of claim 1, wherein the method includes installing the second operating system by the first operating system.

3. The computer-implemented method of claim 1, wherein the method includes installing the second operating system by the first operating system and storing the second operating system in the second storage area.

4. The computer-implemented method of claim 1, wherein the method includes containing the first storage area, the second storage area and the second operating system on one storage device and the step of restoring the first storage area includes the step of using the one storage device and the second operating system.

5. The computer-implemented method of claim 1, wherein the method includes containing the first storage area in a first storage device and containing the second storage area in a second storage device different from the first storage device and the method includes coupling the first and second storage devices using at least one of a USB bus, I/O bus, local area network and wide area network.

6. A computer-implemented method of updating software to a data processing apparatus comprising the steps of:
  (a) storing a first operating system in a first storage area of the apparatus and storing user data in the first storage area using the first operating system;
  (b) storing a sector-by-sector image copy of the first storage area in a second storage area using the first operating system, the image copy comprising the first operating system and user data;
  (c) maintaining a map of the portions of the sector-by-sector based image which have been changed and those portions of the sector-by-sector based image which have not been changed;
  (d) restoring the sector-by-sector based image in the first storage area by copying those portions of the image which have been changed since the copy was made from the second storage area using a second operating system; and
  (e) after step (d), applying an update to the apparatus using at least one of the first operating system and the second operating system.

7. The computer-implemented method of claim 6, wherein the method includes installing the second operating system by the first operating system.

8. The computer-implemented method of claim 6, wherein the method includes installing the second operating system by the first operating system and storing the second operating system in the second storage area.

9. The computer-implemented method of claim 6, wherein the method includes containing the first storage area, the second storage area and the second operating system on one storage device and the step of restoring the first storage area includes the step of using the one storage device and the second operating system.

10. The computer-implemented method of claim 6, wherein the method includes containing the first storage area in a first storage device and containing the second storage area in a second storage device different from the first storage device and the method includes coupling the first and second storage devices using at least one of a USB bus, I/O bus, local area network and wide area network.

* * * * *

UNITED STATES PATENT AND TRADEMARK OFFICE
CERTIFICATE OF CORRECTION

| | | |
|---|---|---|
| PATENT NO. | : 8,145,940 B1 | |
| APPLICATION NO. | : 12/705966 | |
| DATED | : March 27, 2012 | |
| INVENTOR(S) | : Frank C. Wang et al. | |

It is certified that error appears in the above-identified patent and that said Letters Patent is hereby corrected as shown below:

On the cover page of the Letters Patent, next to "Inventors" and at field code (75) "Frank G. Wang" should be changed to --Frank C. Wang--

Signed and Sealed this
Seventeenth Day of July, 2012

David J. Kappos
*Director of the United States Patent and Trademark Office*